United States Patent
Kwong et al.

(10) Patent No.: US 12,480,629 B2
(45) Date of Patent: Nov. 25, 2025

(54) TRIPOD LIGHT

(71) Applicant: TECHTRONIC CORDLESS GP, Anderson, SC (US)

(72) Inventors: Yu Siu Kwong, Hong Kong (CN); Lau Hee Wing, Hong Kong (CN); Hui King Pun, Hong Kong (CN); Kim Eunsuk, Hong Kong (CN); Clinton C. Thackery, Clemson, SC (US); Graham Wilson, Anderson, SC (US)

(73) Assignee: Techtronic Cordless GP, Anderson, SC (US)

( * ) Notice: Subject to any disclaimer, the term of this patent is extended or adjusted under 35 U.S.C. 154(b) by 0 days.

(21) Appl. No.: 18/918,774

(22) Filed: Oct. 17, 2024

(65) Prior Publication Data

US 2025/0035276 A1     Jan. 30, 2025

Related U.S. Application Data

(63) Continuation of application No. 18/306,883, filed on Apr. 25, 2023, now Pat. No. 12,123,568.

(Continued)

(51) Int. Cl.
    *F21S 6/00*      (2006.01)
    *F16M 11/24*      (2006.01)
    (Continued)

(52) U.S. Cl.
    CPC ............ *F21S 6/005* (2013.01); *F16M 11/242* (2013.01); *F21L 4/04* (2013.01); *F21S 9/02* (2013.01);
    (Continued)

(58) Field of Classification Search
    CPC ......... F21S 6/005; F21S 6/006; F21V 17/107; F21V 17/02; F21V 17/007; F21V 21/30;
    (Continued)

(56) References Cited

U.S. PATENT DOCUMENTS

| | | | |
|---|---|---|---|
| 2,188,237 A | 1/1940 | Weaver |
| 3,300,165 A | 1/1967 | O'Kane |
| (Continued) | | |

FOREIGN PATENT DOCUMENTS

| | | |
|---|---|---|
| AU | 2014100225 A4 | 4/2014 |
| CN | 205716603 U | 11/2016 |
| (Continued) | | |

OTHER PUBLICATIONS

Might-D-Light, Might D Light LED125 250 Lumens Black Compact Folding LED Worklight, <https://www.walmart.com/ip/Might-D-Light-LED125-250-Lumens-Black-Compact-Folding-LED-Worklight/21369006?athcpid=21369006&athpgid=Athenaltempage&athcgid=null&athznid=si&athieid=v0&athstid=CS004&athguid=00-8845554f286c0c241f63301c7500271f-f8ecfc2a7b815b0c-01&athancid=null&athena=true> web page visited Apr. 27, 2023 (6 pages).

(Continued)

*Primary Examiner* — Erin Kryukova
(74) *Attorney, Agent, or Firm* — Michael Best & Friedrich LLP

(57) ABSTRACT

A tripod light may include a frame supporting a light assembly. A tripod light may include a support assembly coupled to the frame by a hinge and configured to support the frame on a surface, the support assembly including a first leg, a second leg, and a third leg, each of the legs being pivotable relative to the frame about the hinge between a stowed position adjacent the frame, and a deployed position away from the frame, wherein each of the second leg and the third leg is configured to rotate relative to the first leg between a collapsed position in which each of the second leg and the third leg is aligned with the first leg, and a respective extended position of the second leg and the third leg.

20 Claims, 7 Drawing Sheets

Related U.S. Application Data

(60) Provisional application No. 63/335,987, filed on Apr. 28, 2022.

(51) Int. Cl.

| | | |
|---|---|---|
| *F21L 4/04* | (2006.01) | |
| *F21S 9/02* | (2006.01) | |
| *F21V 17/10* | (2006.01) | |
| *F21V 21/14* | (2006.01) | |
| *F21V 21/22* | (2006.01) | |
| *F21V 21/30* | (2006.01) | |
| *F21V 23/04* | (2006.01) | |

(52) U.S. Cl.
CPC .......... *F21V 17/107* (2013.01); *F21V 21/145* (2013.01); *F21V 21/22* (2013.01); *F21V 23/04* (2013.01); *F21V 21/30* (2013.01)

(58) Field of Classification Search
CPC ........ F21V 21/145; F21V 21/22; F21V 21/26; F16M 11/242; F16M 11/28; F16M 11/38; F16M 11/40; F16M 11/2014; F21L 4/04
See application file for complete search history.

(56) References Cited

U.S. PATENT DOCUMENTS

| | | | |
|---|---|---|---|
| 4,214,724 A * | 7/1980 | Geiger | F16M 11/22 248/167 |
| 4,377,269 A * | 3/1983 | Sellner | F16M 11/10 248/188.7 |
| 5,564,661 A | 10/1996 | Gershon | |
| 5,775,233 A | 7/1998 | Kendall | |
| 5,871,185 A | 2/1999 | Phillips et al. | |
| 6,688,565 B1 | 2/2004 | Chen | |
| 6,899,441 B2 | 5/2005 | Chen | |
| 6,902,294 B2 | 6/2005 | Wright | |
| 7,011,423 B2 | 3/2006 | Chen | |
| D644,089 S | 8/2011 | Intravatola | |
| D645,199 S | 9/2011 | Intravatola | |
| 8,201,979 B2 | 6/2012 | Deighton et al. | |
| 8,651,438 B2 | 2/2014 | Deighton et al. | |
| D724,026 S | 3/2015 | Intravatola | |
| 9,103,495 B2 | 8/2015 | Intravatola | |
| 9,163,823 B2 | 10/2015 | Choksi et al. | |
| 9,170,006 B2 | 10/2015 | Cugini et al. | |
| 9,222,633 B2 | 12/2015 | Inskeep | |
| 9,303,853 B2 | 4/2016 | Deighton et al. | |
| 9,574,725 B2 | 2/2017 | Pellenc | |
| D794,699 S | 8/2017 | Bin-Nun et al. | |
| 9,810,408 B2 | 11/2017 | Fang | |
| 9,816,661 B2 | 11/2017 | Sharrah et al. | |
| 10,094,544 B2 | 10/2018 | Fang | |
| 10,215,331 B2 | 2/2019 | Sharrah et al. | |
| D850,689 S | 6/2019 | Harvey et al. | |
| 10,378,739 B2 | 8/2019 | Harvey et al. | |
| 10,634,327 B2 | 4/2020 | Cornell et al. | |
| D883,549 S | 5/2020 | Harvey et al. | |
| 10,655,777 B2 | 5/2020 | Sharrah et al. | |
| 10,690,304 B2 | 6/2020 | Adams et al. | |
| D902,463 S | 11/2020 | Harvey et al. | |
| 10,907,809 B2 | 2/2021 | Harvey et al. | |
| 11,015,773 B2 | 5/2021 | Adams et al. | |
| 11,112,096 B2 | 9/2021 | Harvey et al. | |
| 11,112,099 B2 | 9/2021 | Miwa | |
| 11,262,020 B2 | 3/2022 | Wenzel et al. | |
| 11,306,904 B1 | 4/2022 | Harvey et al. | |
| 2005/0092878 A1 | 5/2005 | Murray et al. | |
| 2008/0191105 A1* | 8/2008 | Bogel | F16M 11/16 248/170 |
| 2012/0261530 A1 | 10/2012 | Deighton et al. | |
| 2013/0128565 A1 | 5/2013 | Cugini et al. | |
| 2013/0265780 A1 | 10/2013 | Choksi et al. | |
| 2014/0246547 A1 | 9/2014 | Intravatola | |
| 2018/0149344 A1 | 5/2018 | Cornell et al. | |
| 2020/0224862 A1 | 7/2020 | Cornell et al. | |
| 2021/0140614 A1* | 5/2021 | Miwa | F21V 21/06 |
| 2021/0270432 A1 | 9/2021 | Adams et al. | |
| 2021/0404640 A1 | 12/2021 | Harvey et al. | |
| 2022/0069399 A1 | 3/2022 | Williams et al. | |

FOREIGN PATENT DOCUMENTS

| | | | |
|---|---|---|---|
| CN | 212390146 U | 1/2021 | |
| CN | 215446262 U | 1/2022 | |
| DE | 8713080 U1 | 12/1987 | |
| DE | 3733956 A1 | 4/1989 | |
| DE | 202011001154 U1 * | 4/2011 | ............. F16M 11/16 |
| DE | 202014010075 U1 * | 3/2015 | ........... G03B 17/561 |
| EP | 0258646 A2 * | 3/1988 | |
| WO | WO2021016196 A1 | 1/2021 | |

OTHER PUBLICATIONS

Might-D-Light, "10-Watt 400-Lumen Dark Gray Rechargeable Folding LED Work Light," <https://www.homedepot.com/p/Might-D-Light-10-Watt-400-Lumen-Dark-Gray-Rechargeable-Folding-LED-Work-Light-LED140/205756057> web page visited Apr. 27, 2023 (3 pages).

Swanson, "9000 Lumens, Corded Standing LED Work Light with Adjustable Stand, 110-Watt Power Outlet & Bluetooth Speaker," <https://www.homedepot.com/p/Swanson-9000-Lumens-Corded-Standing-LED-Work-Light-with-Adjustable-Stand-110-Watt-Power-Outlet-Bluetooth-Speaker-950BT-6037TP/311708663> web page visited Apr. 27, 2023 (4 pages).

Extended European Search Report for Application No. 23169749.1 dated Sep. 13, 2023 (14 pages).

* cited by examiner

TRIPOD LIGHT

CROSS-REFERENCE TO RELATED APPLICATIONS

This application is a continuation of U.S. patent application Ser. No. 18/306,883, filed Apr. 25, 2023, and claims priority to U.S. Provisional Patent Application No. 63/335,987, filed Apr. 28, 2022, the entire contents of each of which are hereby incorporated by reference.

TECHNICAL FIELD

The present disclosure relates to lighting devices, and more particularly to portable workspace lighting devices.

BACKGROUND

Area lights are used to illuminate worksites, outdoor spaces, or other areas without permanent lighting fixtures. Many such areas may lack electricity, requiring the area light to include a dedicated power source such as a battery. Such spaces are often remote, requiring the area light to be transported to the worksite and often manually carried by an operator. Many portable lights, such as hand held flashlights, are easy to carry to the intended area but do not provide enough light to sufficiently illuminate the area. Other larger lights provide sufficient lighting but may be cumbersome to transport.

SUMMARY

The present disclosure provides, in one aspect, a tripod light including: a frame supporting a light assembly; and a support assembly coupled to the frame by a hinge and configured to support the frame on a surface, the support assembly including a first leg, a second leg, and a third leg, each of the legs being pivotable relative to the frame about the hinge between a stowed position adjacent the frame, and a deployed position away from the frame; wherein each of the second leg and the third leg is configured to rotate relative to the first leg between a collapsed position in which each of the second leg and the third leg is aligned with the first leg, and a respective extended position of the second leg and the third leg.

The present disclosure provides, in another aspect, a tripod light including: a frame supporting a light assembly; and a support assembly configured to support the frame on a surface, the support assembly including a first leg, a second leg, a third leg, and a pivot shaft, each of the second leg and the third leg being configured to rotate about the pivot shaft relative to the first leg; wherein the pivot shaft is movable relative to the frame.

The present disclosure provides, in another aspect, a light including: a frame supporting a light assembly; a support assembly coupled to the frame by a hinge and configured to support the light on a surface, the support assembly including a first leg, a second leg coupled to the first leg, and a pivot shaft, the second leg being configured to rotate about the pivot shaft relative to the first leg between a collapsed position in which the second leg is aligned with the first leg, and an extended position at which the second leg is spaced apart from the first leg; wherein the pivot shaft and each of the legs are pivotable relative to the frame about the hinge between a stowed position adjacent the frame, and a deployed position away from the frame.

Other features and aspects of the embodiments will become apparent by consideration of the following detailed description and accompanying drawings.

DETAILED DESCRIPTION

Figure 1:
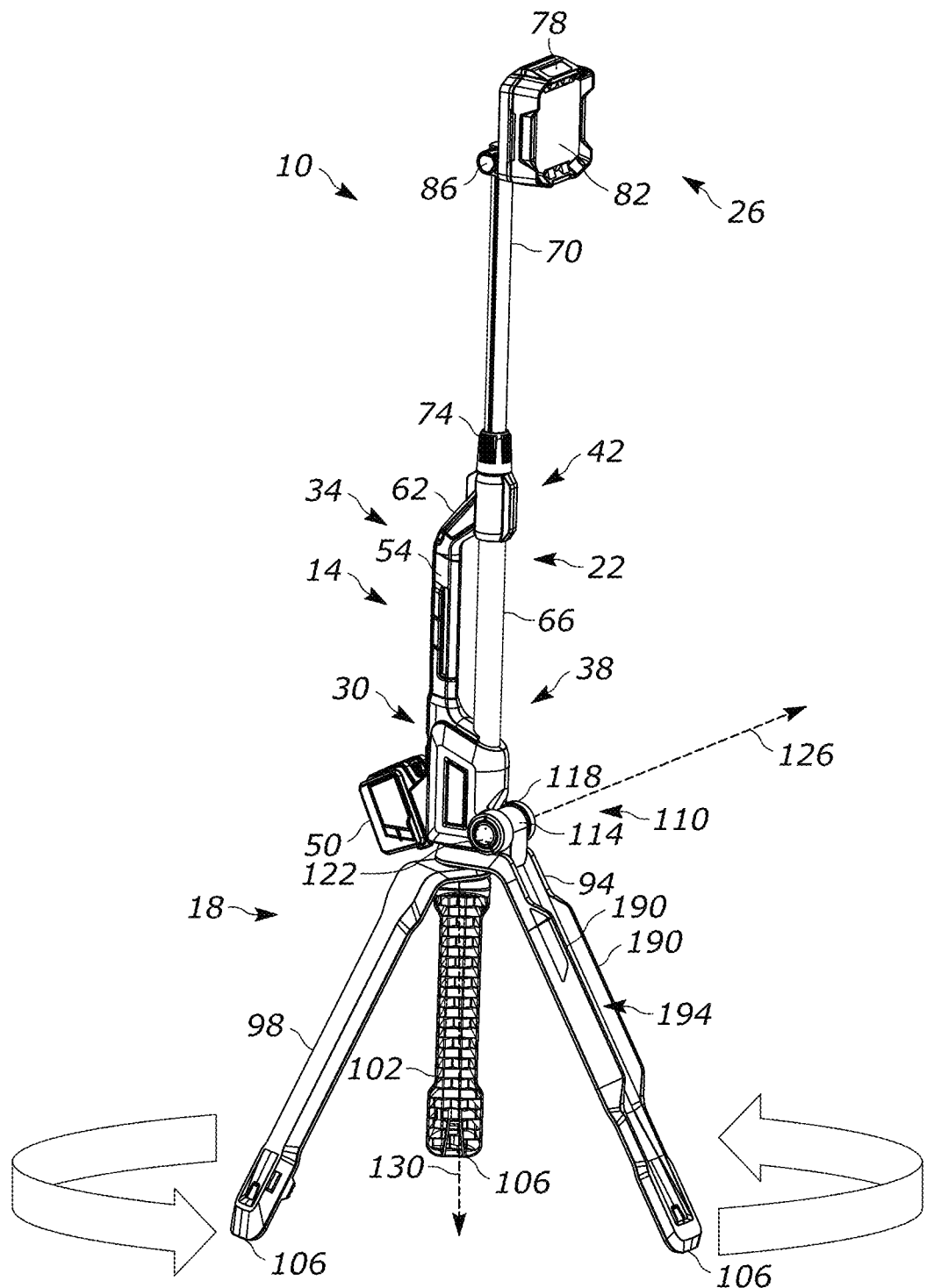
FIG. 1 is a perspective view illustrating a tripod light arranged in a deployed configuration according to an embodiment of the disclosure.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

Features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Figure 2:
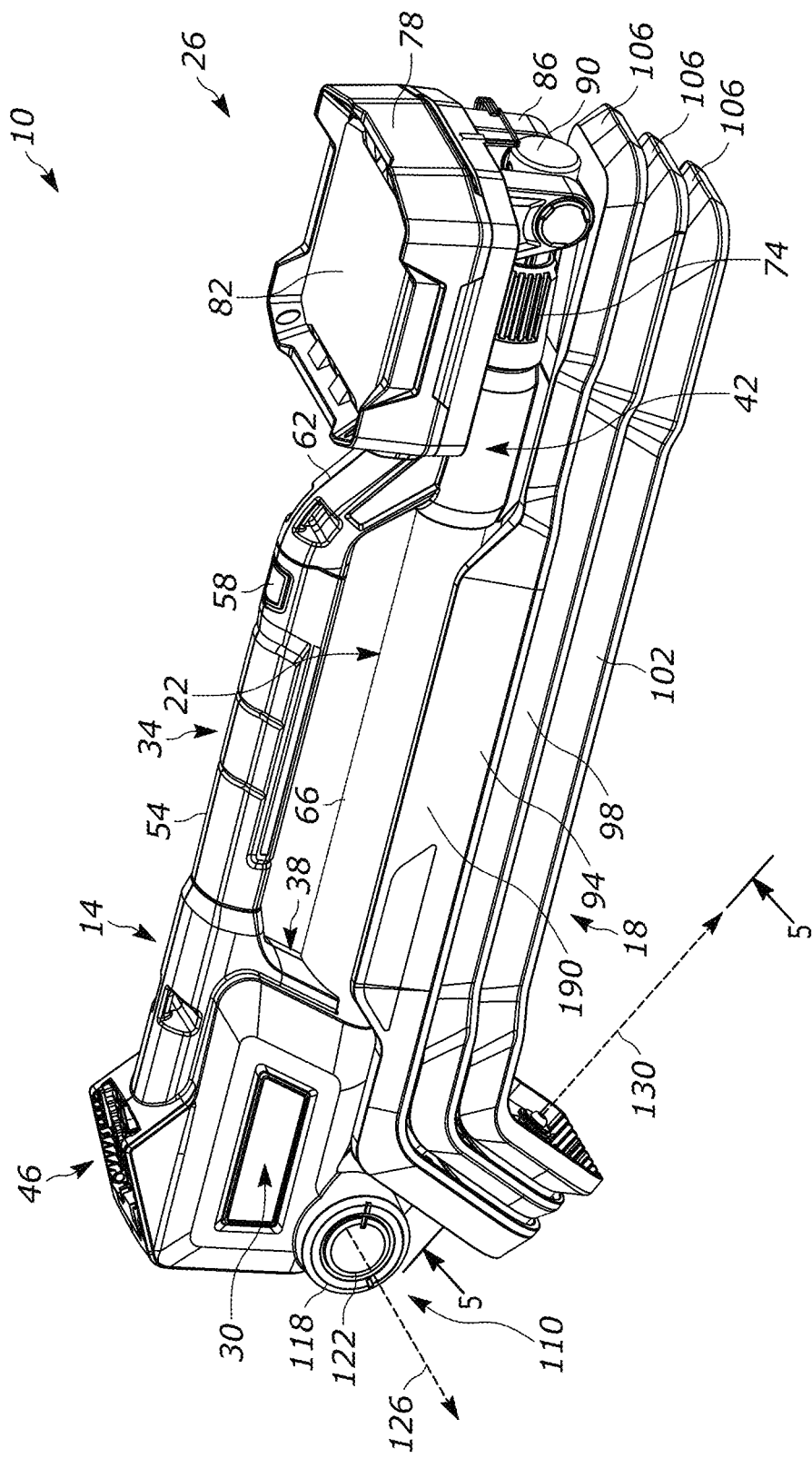
FIG. 2 is another perspective view illustrating the tripod light of FIG. 1 arranged in a collapsed or storage configuration.
Figure 3:
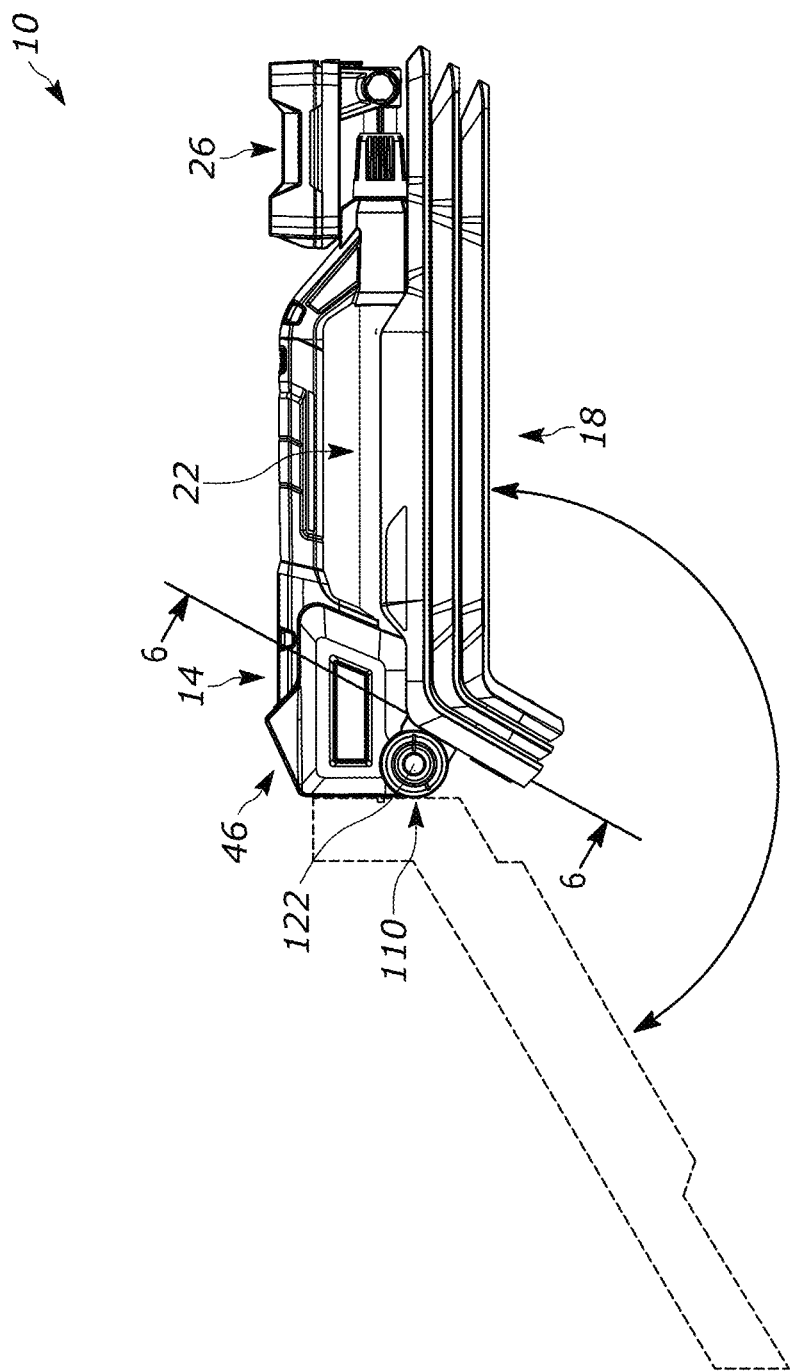
FIG. 3 is a side view illustrating the tripod light of FIG. 1 in the collapsed or storage configuration.

FIGS. 1-3 illustrate an embodiment of a tripod light 10 operable to illuminate a workspace. The tripod light 10 includes a housing or frame 14 and a collapsible support assembly 18 that is pivotably coupled to the frame 14. In the illustrated embodiment, the support assembly 18 is embodied as a support or tripod assembly or collapsible or storable tripod 18 that is pivotably coupled to the frame 14. The tripod light 10 also includes a telescoping shaft assembly 22 that is coupled to the frame 14, and a head light 26 that is pivotably coupled to the shaft assembly 22.

Figure 8:
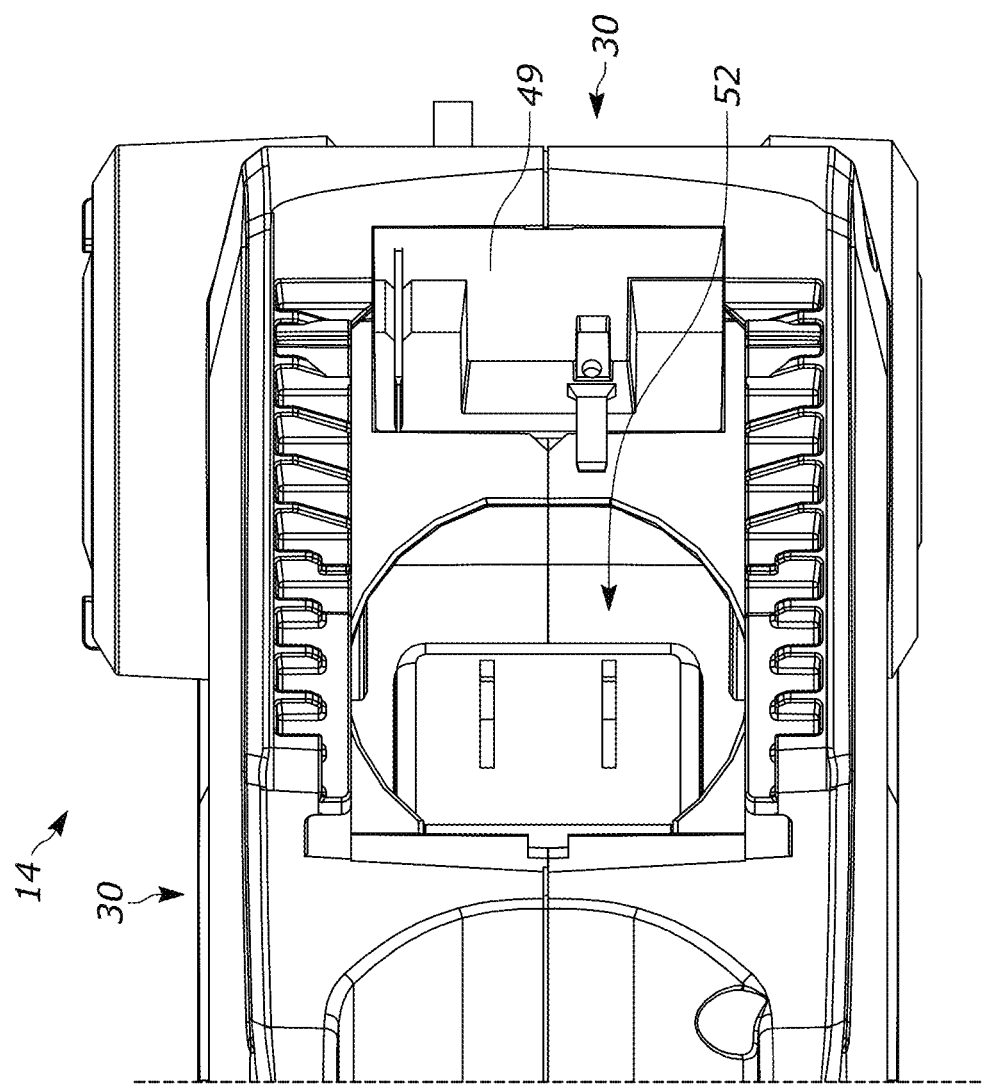
FIG. 8 is a detail perspective view illustrating portions of the tripod light of FIG. 1.

With reference to FIGS. 1 and 2, the frame 14 includes a base portion 30, an elongated tube-shaped handle portion 34 that extends away from the base portion 30, a first sleeve 38 that is defined adjacent the base portion 30, and a second sleeve 42 defined at a distal end of the handle portion 34. With reference to FIGS. 1, 2, and 8, the base portion 30 includes a battery receptacle 46 that is located on a side opposite from the first sleeve 38. A battery connection portion 49 (e.g., a terminal connection block) is supported on the base portion 30 adjacent the battery receptacle 46. The battery receptacle 46 receives a battery pack 50 that can supply power to the tripod light 10. The battery pack 50 may be selectively and removably inserted into the battery receptacle 46 and connected to the battery connection portion 49 to mechanically and electrically connect the battery pack 50 to the tripod light 10. When the battery pack 50 is connected to the battery receptacle 46, the head light 26 is capable of receiving power (e.g. direct current (DC) voltage) from the battery pack 50 to illuminate a workspace. With continued reference to FIG. 8, the illustrated tripod light 10 also includes a power receptacle 52 that is positioned on the base portion 30 and that is located within or adjacent the battery receptacle 46. The power receptacle 52 can connect to a power cord (not shown) to supply power (e.g., alternating current (AC) voltage) from a remote power source (e.g., a power outlet) to the tripod light 10.

With reference to FIGS. 1 and 2, the handle portion 34 is elongated and tube-shaped and extends from the base portion 30 to the second sleeve 42. The handle portion 34 includes a grip 54 that extends generally parallel to the shaft assembly 22. The grip 54 may be grasped and held by a user to lift and carry the tripod light 10, or to reposition the tripod light 10. In some embodiments, the grip 54 may be overmolded. The handle portion 34 also supports a switch actuator or on/off button 58. The on/off button 58 may be operable to turn the tripod light 10 on or off and is ergonomically located at the handle portion 34 to provide case of access. In the illustrated embodiment, the grip 54 is located generally between the on/off button 58 and the battery receptacle 46. The handle portion 34 further includes a bent segment 62 that bends away from the grip 54 and that terminates at the second sleeve 42.

The shaft assembly 22 includes an outer shaft segment 66 and an inner shaft segment 70. Each end of the outer shaft segment 66 is fixedly coupled to the first and second sleeves 38, 42, respectively, of the frame 14. The inner shaft segment 70 is receivable into the outer shaft segment 66 in a telescoping arrangement. Specifically, the inner shaft segment 70 is slidable into or out from the outer shaft segment 66 along a direction of its longitudinal axis between a retracted position (FIG. 2) and a fully extended position (FIG. 1). A collar 74 surrounds the inner shaft segment 70 and is coupled to the second sleeve 42. The collar 74 is rotatable to selectively clamp the inner shaft segment 70 to hold the inner shaft segment 70 at a fixed position relative to the outer shaft segment 66, and to release the inner shaft segment 70 to permit sliding movement relative to the outer shaft segment 66.

With continued reference to FIGS. 1 and 2, the head light 26 includes a light housing 78, a lens 82 supported on the light housing 78, and a lighting element (not shown) supported behind or within the lens 82. The head light 26 is pivotably coupled to a distal end of the inner shaft segment 70, which allows the head light 26 to be oriented with the lens 82 facing in a plurality of different directions. In particular, the light housing 78 includes a pair of projections 86, and the shaft assembly 22 includes a pivot mount 90 embodied as a cap affixed to the distal end of the inner shaft segment 70. The pivot mount 90 is coupled between the projections 86.

The tripod 18 may selectively support the tripod light 10 on a ground surface. The tripod 18 is pivotably coupled to the frame 14 and includes a first leg 94, a second leg 98, and a third leg 102. Each leg 94, 98,102 includes a foot 106 located at a distal end thereof for engaging a ground surface. A hinge assembly 110 couples the first leg 94 to the frame 14. The hinge assembly 110 includes a mounting projection 114 formed on the first leg 94, a pair of hinge sleeves 118 formed on the frame 14, and a hinge button 122 operable to lock or release the hinge assembly 110. The hinge sleeves 118 are located adjacent the first sleeve 38 and opposite from the battery receptacle 46. The mounting projection 114 is disposed between the hinge sleeves 118 in the hinge assembly 110. The hinge assembly 110 defines a first axis or hinge axis 126 that extends generally perpendicular to a central longitudinal axis of the shaft assembly 22. The first leg 94 is pivotable about the hinge axis 126 relative to the frame 14 between a deployed or unfolded position (FIGS. 1 and 3) and a stowed or folded position (FIGS. 2 and 3).

Figure 4:
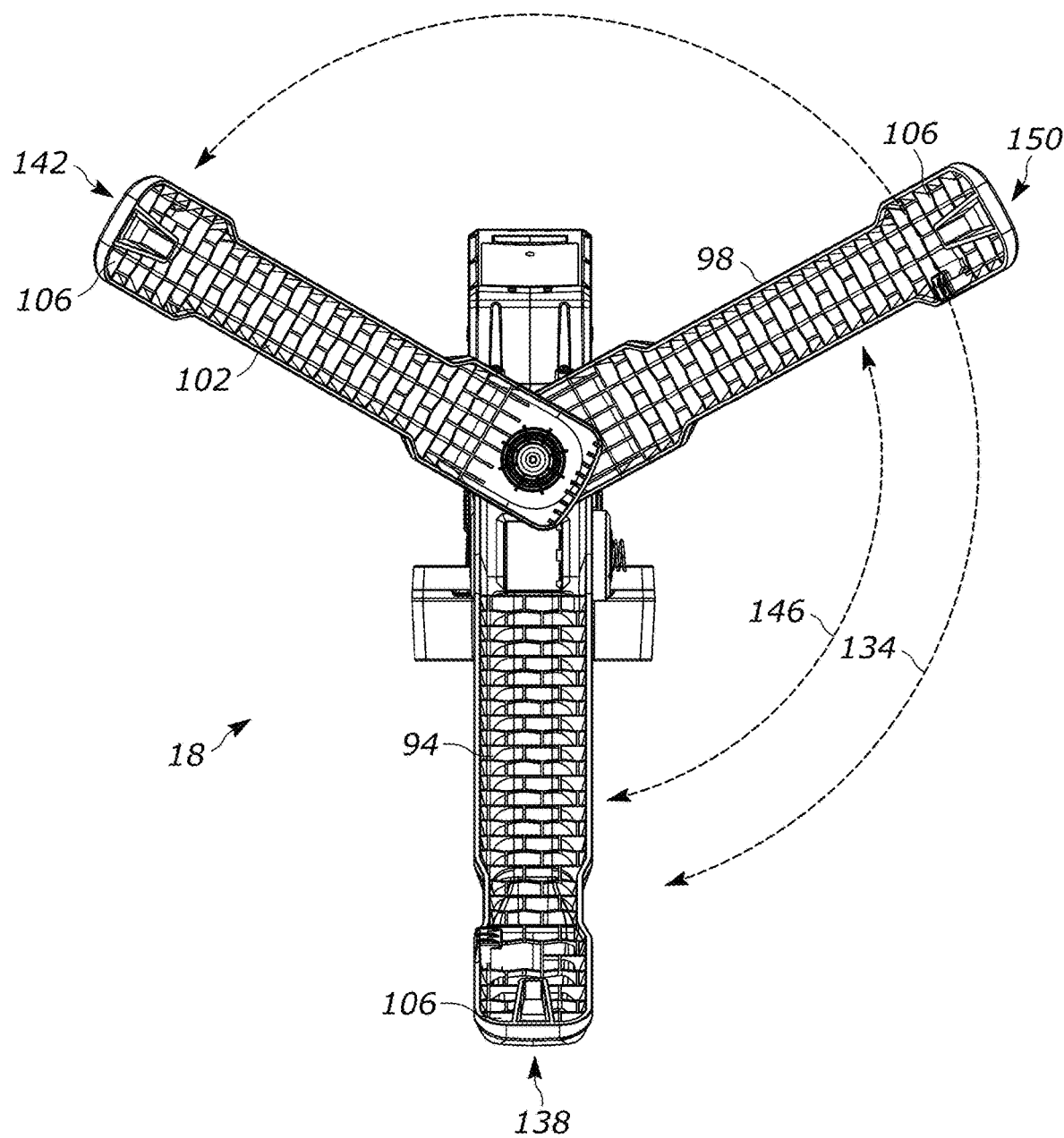
FIG. 4 is a bottom view illustrating the tripod light of FIG. 1 in the deployed configuration.

With reference to FIGS. 1-4, proximal ends of the first, second, and third legs 94, 98, 102 are pivotably coupled to each other about a second axis or pivot axis 130 that extends along or parallel with the outer shaft segment 66. More specifically, each of the second leg 98 and the third leg 102 is pivotable or rotatable about the pivot axis 130 (rotatably horizontally about the pivot axis 130 as shown from the perspective of FIG. 1) relative to the first leg 94 between collapsed or storage positions (FIGS. 2 and 3) and respective extended positions (FIGS. 1 and 4). The hinge axis 126 and the pivot axis 130 are non-colinear and are non-parallel to one another in any arrangement of the tripod 18. In the collapsed or storage position, the feet 106 of each of the legs 94-102 are located adjacent one another such that the legs 94-102 assume a compact arrangement. In their respective extended positions (FIGS. 1 and 4), the feet 106 of each of the legs 94-102 are spaced apart from one another at approximately 120 degree intervals about the pivot axis 130 such that the legs 94-102 assume a tripod arrangement.

With reference to FIG. 4, the third leg 102 is rotatable relative to the first leg 94 about the pivot axis 130 from a collapsed position 138 of the third leg 102 to an extended position 142 of the third leg 102. Similarly, the second leg 98 is rotatable relative to the first leg 94 about the pivot axis 130 from the collapsed position 138 to an extended position 150 the second leg 94. In the collapsed position 138 of the second and third legs 98, 102, the second and third legs are aligned with the first leg 94. In the extended position 150 of the third leg 102, the third leg 102 is spaced apart from the first leg 94 by a first angle 134 about the pivot axis 130. In the illustrated embodiment, the first angle 134 is approximately 240 degrees. In other embodiments, the first angle 134 may be greater or smaller than 180 degrees. In the extended position of the second leg 98, the second leg 98 is spaced apart from the first leg 94 by a second angle 146 about the pivot axis 130. In the illustrated embodiment, the second angle 146 is approximately 120 degrees. In other embodiments, the second angle 146 can be greater than ten degrees and less than the first angle. The angles 134, 146 are illustrated in FIG. 4 as counterclockwise rotations of the legs 98, 102 from the collapsed positions to the extended positions. However, in other embodiments, the tripod light 10 may be configured such that the legs 98, 102 rotate clockwise in the perspective of FIG. 4.

Figure 6:
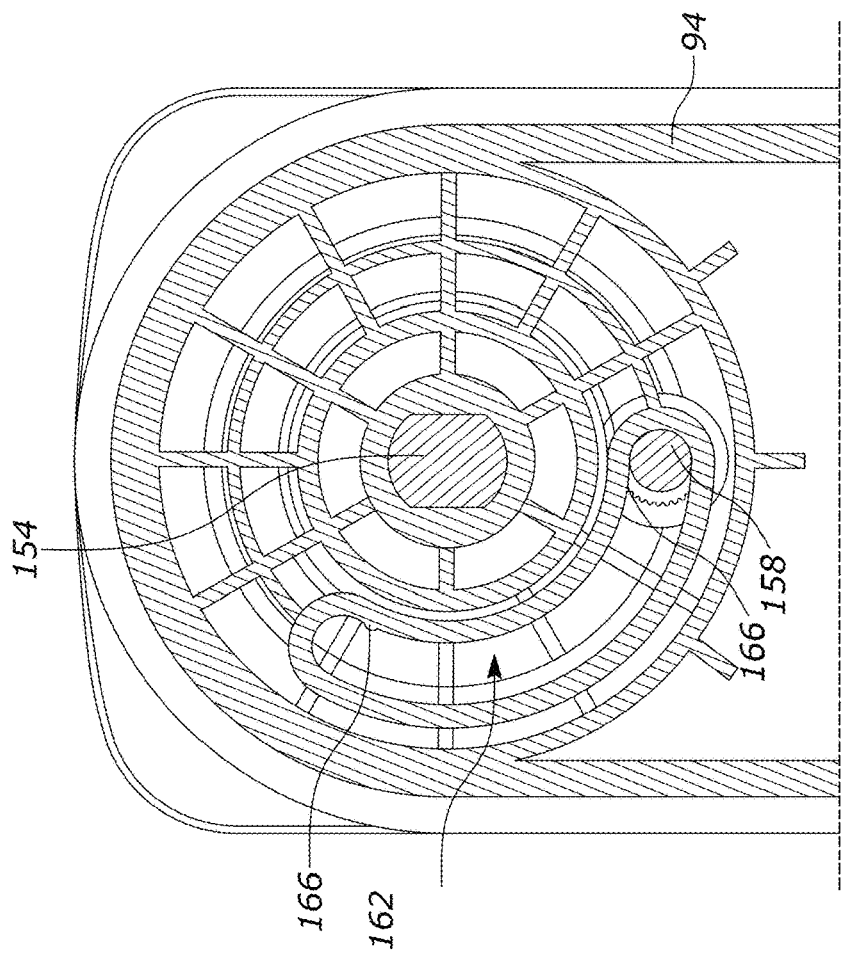
FIG. 6 is a cross-section view taken through line 6-6 of FIG. 3 and illustrating portions of the tripod light of FIG. 1.
Figure 5:
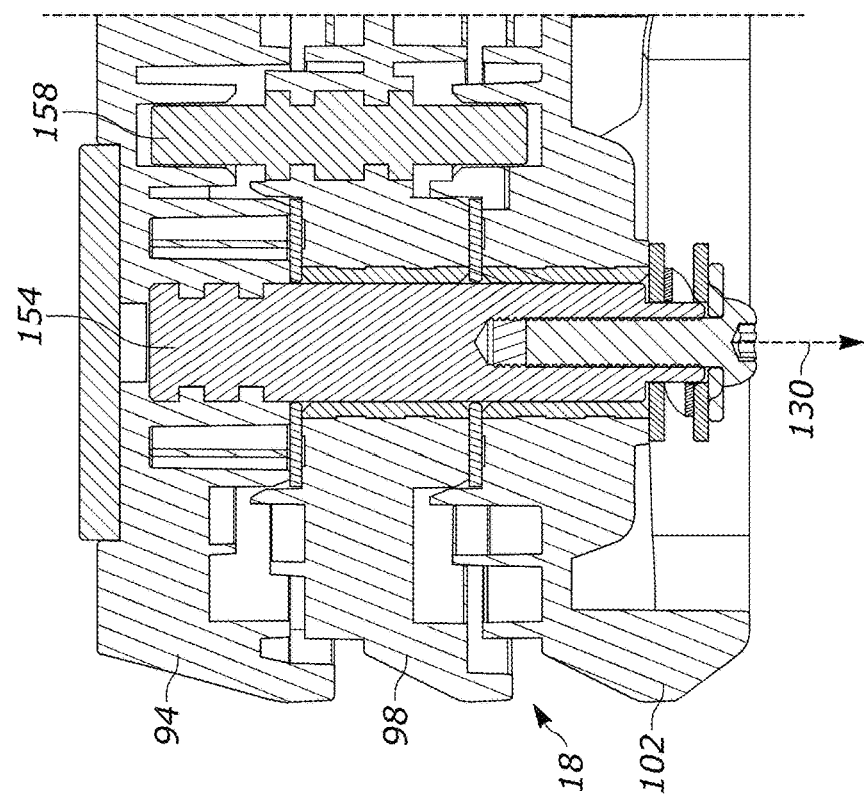
FIG. 5 is a cross-section view taken through line 5-5 of FIG. 2 and illustrating portions of the tripod light of FIG. 1.

With reference to FIGS. 4-6, the tripod 18 includes a pivot shaft 154 that pivotably couples the first, second, and third legs 94, 98, 102 to one another. The pivot shaft 154 is non-rotatably fixed to the proximal end of the first leg 94 and extends through each of the proximal ends of the second and third legs 98, 102. The pivot shaft 154 defines the pivot axis 130. Each of the second and third legs 98, 102 are rotatable about the pivot shaft 154 relative to the first leg 94 and relative to each other.

The tripod 18 also includes a catch member 158 that limits rotation of the second and third legs 98, 102 about the pivot axis 130 and relative to one another. In the illustrated embodiment, the catch member 158 is embodied as an elongated shaft or pin 158 that is fixedly secured to the proximal end of the second leg 98. Each of two ends of the pin 158 are received into channels 162 (FIG. 6) defined by the proximal ends of the first leg 94 and the third leg 102, respectively. Each channel 162 is elongated and has a curvilinear shape and extends about 120 degrees about the pivot axis 130 from end to end, corresponding to the approximately 120 degree spacing of the legs 94, 98, 102 in the extended positions. Each of the first and third legs 94, 102 also include detent protrusions 166 formed in the proximal ends and protruding into the channel 162 proximate each respective end of the channel 162. When the pin 158 reaches either end of the channel 162, the respective detent protrusion 166 engages the pin 158 to releasably hold the pin 158 in place at the end of the channel 162. This releasably secures each of the second and third legs 98, 102 in the collapsed position 138 or in their respective extended positions 142, 150.

With reference to FIG. 6, as the third leg 102 is rotated toward the extended position 142, the pin 158 engages an end wall formed at the end of the channel 162 so that the third leg 102 subsequently pulls the second leg 98 toward its extended position 150 as the third leg 102 continues movement toward its extended position 142 (i.e. as the third leg 102 moves to or reaches the degree of the first angle 134). That is, as the third leg 102 rotates from the collapsed position 138 (FIG. 4) toward the extended position 142, the pin 158 traverses the channel 162 of the third leg 102 until the pin 158 reaches the end wall of the channel 162. As the third leg 102 continues rotation toward the extended position 142, the end wall of the channel 162 of the third leg 102 engages the pin 158 and imparts a force on the pin 158, causing the second leg 98 to begin rotation toward the extended position 150. In some embodiments, the channels 162 may be further elongated such that the third leg 102 may be rotated in either direction (i.e. clockwise and counter-clockwise) from the collapsed position to the extended position. In the illustrated embodiment, the detent protrusions 166 ensure that the legs 94-102 maintain approximately 120 degrees of spacing from one another in their respective extended positions.

Figure 7:
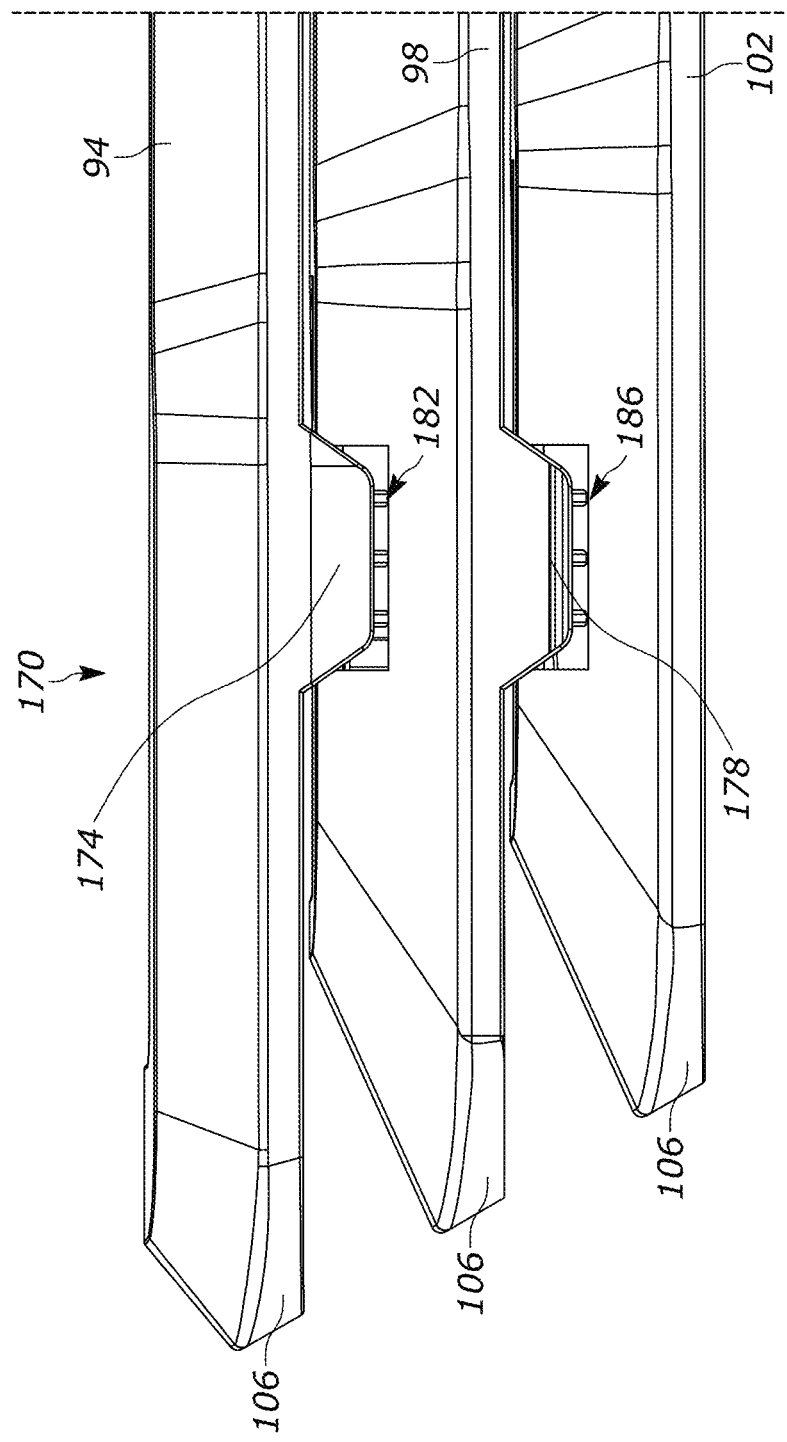
FIG. 7 is a detailed side view of portions of the tripod light of FIG. 1 in the collapsed or storage configuration.

With reference to FIG. 7, the legs 94, 98, 102 include a catch arrangement 170 that releasably secures the second and third legs 98, 102 in the collapsed position. The catch arrangement 170 includes a first catch member or first hook 174 located on the first leg 94, and a second catch member or second hook 178 located on the second leg 98. The catch arrangement 170 also includes a first catch recess 182 that is defined in the second leg 98 and that corresponds to the first hook 174, and a second catch recess 186 defined in the third leg 102 and corresponding to the second hook 178. When the second and third legs 98, 102 are moved to the collapsed positions, the first hook 174 engages the first catch recess 182 and the second hook 178 engages the second catch recess 186 to further releasably secure the legs 98, 102 in the collapsed positions.

With reference to FIG. 1, the first leg 94 includes a pair of lateral support walls 190 that are disposed at each respective lateral side of the first leg 94 and that extend longitudinally between the foot 106 and the mounting projection 114. A slot or recess 194 is defined between the lateral support walls 190. In the stowed position, the shaft assembly 22 is received in the recess 194 of the first leg 94. Stated another way, in the stowed position, a portion of the first leg 94 surrounds a portion of the shaft assembly 22 on three orthogonal sides of the shaft assembly 22. This nested arrangement allows the first leg 94 to be strengthened or reinforced by the lateral support walls 190 without increasing a form factor of the tripod light 10.

With reference to FIG. 2, the battery receptacle 46 is positioned between the handle portion 34 and the tripod 18. More specifically, the battery receptacle 46 is positioned between the proximal end of the first leg 94 and the handle portion 34, or between the hinge assembly 110 and the handle portion 34. This arrangement allows the collective weight of the tripod 18 and the battery pack 50 to offset a weight of the head light 26 when a user carries the tripod light 10 by the handle portion 34 in a collapsed arrangement (FIG. 2), which provides balance for the tripod light 10 in the user's hand.

In operation, the tripod light 10 is reconfigurable between a deployed configuration (FIG. 1) and a collapsed or stowed or storage configuration (FIG. 2). In the deployed configuration, the head light 26 is supported in an elevated position above the ground surface. In the collapsed configuration, the tripod light 10 assumes a condensed form factor more conducive to storing or transporting the tripod light 10. To move the tripod light 10 from the deployed configuration to the collapsed configuration, first the user collapses the legs 94-102 by pivoting the second and third legs 98, 102 about the pivot axis 130 relative to the first leg 94 from the extended leg positions to the collapsed leg position at which each of the feet 106 are located adjacent one another. Next, the user presses the hinge button 122 to unlock the hinge assembly 110. With the hinge button 122 pressed, the user then pivots the first leg 94 about the hinge axis 126 from the deployed position to the stowed position adjacent the shaft assembly 22. In the stowed position, the shaft assembly 22 is nested into the first leg 94 to maintain a compact form factor. The user then releases the hinge button 122 to lock the hinge assembly 110, so that the tripod 18 is held in the stowed position.

Before or after adjusting the legs 94-102 of the tripod 18, the user rotates the collar 74 to release the inner shaft segment 70 and slides the inner shaft segment 70 downward to the retracted position within the outer shaft segment 66. The user then rotates the collar 74 in an opposite direction to clamp and hold the inner shaft segment 70 in the retracted position. When the tripod light 10 is in the collapsed configuration, the head light 26 can still be operated to illuminate a workspace, provided that tripod light is attached to a power source (e.g., the battery pack 50 or the power cord (not shown)). The tripod light 10 can also be carried and used as a portable lamp or torch in this configuration.

The user can move the tripod light 10 from the collapsed configuration to the deployed configuration by performing a process generally opposite to that described above.

Various features of the disclosure are set forth in the following claims.

The invention claimed is:

1. A tripod light comprising:
a frame supporting a light assembly; and
a support assembly coupled to the frame by a hinge and configured to support the frame on a surface, the support assembly including a first leg, a second leg, and a third leg, each of the first leg, the second leg, and the third leg pivotable relative to the frame about the hinge between a stowed position adjacent the frame and a deployed position away from the frame;
wherein one or more of the first leg, the second leg, and the third leg is configured to rotate between a collapsed position in which each of the first leg, the second leg, and the third leg are aligned with each other, and a respective extended position of the one or more of the first leg, the second leg, and the third leg to support the frame on a surface in the deployed position.

2. The tripod light of claim 1, wherein the hinge includes a hinge sleeve disposed on the frame or the first leg and a hinge projection disposed on the other of the frame and the first leg, wherein the hinge projection is movable relative to the hinge sleeve.

3. The tripod light of claim 1, wherein the hinge includes a lock configured to selectively lock to prevent the first leg, the second leg, and the third leg from pivoting relative to the frame.

4. The tripod light of claim 1, wherein the hinge defines a first axis about which each of the first leg, the second leg, and the third leg pivots relative to the frame, and wherein each of the first leg and the second leg is configured to rotate relative to the first leg about a second axis that is non-parallel to the first axis.

5. The tripod light of claim 1, wherein the second leg rotates relative to the first leg through a first angle from the collapsed position of the second leg to the extended position of the second leg, and wherein the third leg rotates relative to the first leg through a second angle from the collapsed position of the third leg to the extended position of the third leg, and wherein the first angle is greater than 10 degrees and the second angle is greater than 180 degrees.

6. The tripod light of claim 1, wherein a pivot shaft rotatably couples the first leg, the second leg, and the third leg to each other, and wherein each of the second leg and the third leg is configured to rotate about the pivot shaft relative to the first leg.

7. The tripod light of claim 1, wherein the second leg is rotatable between the collapsed position of the second leg and the extended position of the second leg and the third leg is rotatable between the collapsed position of the third leg and the extended position of the third leg, wherein the support assembly is configured such that the third leg, when moved toward the extended position of the third leg, engages the second leg to pull the second leg toward the extended position of the second leg in response to continued movement of the third leg toward the extended position of the third leg.

8. The tripod light of claim 1, further comprising a shaft assembly coupled to the frame and supporting the light assembly.

9. The tripod light of claim 8, wherein the first leg includes two lateral support walls protruding from two lateral sides of the first leg, respectively, and defining a recess therebetween, and wherein the shaft assembly is received into the recess in response to the support assembly being in the stowed position.

10. The tripod light of claim 1, wherein the light assembly is operable to emit light when the first leg is located in the stowed position.

11. A tripod light comprising:
a frame supporting a light assembly; and
a support assembly configured to support the frame on a surface, the support assembly including a first leg, a second leg, a third leg, and a pivot shaft, each of the second leg and the third leg configured to rotate about the pivot shaft relative to the first leg,
wherein the pivot shaft is movable with the first leg, the second leg, and the third leg relative to the frame.

12. The tripod light of claim 11, wherein the frame includes a base portion and a handle, and wherein the base portion defines a battery receptacle.

13. The tripod light of claim 11, further comprising a hinge pivotably coupling the pivot shaft and each of the first leg, the second leg, and the third leg to the frame.

14. The tripod light of claim 13, wherein the hinge includes a lock configured to selectively lock to prevent the first leg, the second leg, and the third leg from pivoting relative to the frame.

15. The tripod light of claim 11, wherein each of the second leg and the third leg is configured to rotate about the pivot shaft relative to the first leg between a collapsed position in which each of the second leg and the third leg is aligned with the first leg, and a respective extended position of the second leg and the third leg.

16. The tripod light of claim 15, wherein the second leg is rotatable between the collapsed position of the second leg and the extended position of the second leg and the third leg is rotatable between the collapsed position of the third leg and the extended position of the third leg, wherein the support assembly is configured such that the third leg, when moved toward the extended position of the third leg, engages the second leg to pull the second leg toward the extended position of the second leg in response to continued movement of the third leg toward the extended position of the third leg.

17. The tripod light of claim 11, wherein each of the first leg, the second leg, and the third leg is pivotable relative to the frame between a stowed position adjacent the frame and a deployed position away from the frame.

18. The tripod light of claim 11, further comprising a shaft assembly coupled to the frame and supporting the light assembly.

19. A light comprising:
- a frame supporting a light assembly; and
- a support assembly coupled to the frame by a hinge and configured to support the light on a surface, the support assembly including a first leg, a second leg coupled to the first leg, and a pivot shaft, the second leg configured to rotate about the pivot shaft relative to the first leg between a collapsed position in which the second leg is aligned with the first leg, and an extended position at which the second leg is spaced apart from the first leg,
- wherein the pivot shaft and each of the first leg and the second leg are pivotable relative to the frame about the hinge between a stowed position adjacent the frame and a deployed position away from the frame.

20. The light of claim 19, wherein in the extended position, the second leg is spaced apart from the first leg by a first angle that is greater than 10 degrees.

\* \* \* \* \*